US010088297B2

(12) United States Patent
Ryu et al.

(10) Patent No.: US 10,088,297 B2
(45) Date of Patent: Oct. 2, 2018

(54) APPARATUS AND METHOD FOR MEASURING THICKNESS

(71) Applicant: Samsung Electronics Co., Ltd., Suwon-si, Gyeonggi-do (KR)

(72) Inventors: Sung Yoon Ryu, Suwon-si (KR); Younghoon Sohn, Incheon (KR); Yusin Yang, Seoul (KR); Chungsam Jun, Suwon-si (KR); Yunjung Jee, Seongnam-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 15/464,896

(22) Filed: Mar. 21, 2017

(65) Prior Publication Data
US 2017/0363418 A1 Dec. 21, 2017

(30) Foreign Application Priority Data

Jun. 17, 2016 (KR) .................. 10-2016-0075906

(51) Int. Cl.
G01B 9/02 (2006.01)
G01B 11/06 (2006.01)
(52) U.S. Cl.
CPC .......... *G01B 11/06* (2013.01); *G01B 9/02001* (2013.01); *G01B 9/02021* (2013.01);
(Continued)
(58) Field of Classification Search
CPC ...... G01B 9/02; G01B 11/002; G01B 11/026; G01D 5/266; G01D 5/38
(Continued)

(56) References Cited

U.S. PATENT DOCUMENTS 5,091,647 A 2/1992 Carduner et al.
9,163,931 B2 10/2015 Matsudo et al.
(Continued)

FOREIGN PATENT DOCUMENTS

KR 100673880 B1 1/2007
KR 101388239 B1 4/2014
(Continued)

OTHER PUBLICATIONS

D. Spiga et al., "Characterization of multilayer stack parameters from X-ray reflectivity data using the PPM program; measurements and comparison with TEM results", Proceedings of the SPIE, Space Telescopes and Instrumentation II: Ultraviolet to Gamma Ray, vol. 6266, 62661.

*Primary Examiner* — Md M Rahman
(74) *Attorney, Agent, or Firm* — Harness, Dickey & Pierce, P.L.C.

(57) ABSTRACT

Disclosed are apparatuses and methods for measuring a thickness. The apparatus for measuring a thickness including a light source that emits a femto-second laser, an optical coupler through which a portion of the femto-second laser is incident onto a target and other portion of the femto-second laser is incident onto a reference mirror, a detector configured to receive a reflection signal reflected on the reference mirror and a sample signal generated from the target and configured to measure a thickness of the target based on an interference signal between the reflection signal and the sample signal, and a plurality of optical fiber lines configured to connect the light source, the optical coupler, and the detector to each other may be provided.

10 Claims, 7 Drawing Sheets

(52) U.S. Cl.
CPC ...... *G01B 11/0616* (2013.01); *G01B 11/0625* (2013.01); *G01B 11/0675* (2013.01); *G01B 2210/56* (2013.01)

(58) Field of Classification Search
USPC .......................................... 356/482
See application file for complete search history.

(56) References Cited

U.S. PATENT DOCUMENTS

| | | | | |
|---|---|---|---|---|
| 2007/0127034 | A1* | 6/2007 | Koshimizu | G01J 5/0003 356/498 |
| 2010/0078576 | A1* | 4/2010 | Ntziachristos | A61B 5/0073 250/459.1 |
| 2012/0127428 | A1* | 5/2012 | Isogai | A61B 3/102 351/206 |
| 2013/0077084 | A1 | 3/2013 | Liu | |
| 2013/0258285 | A1* | 10/2013 | Iwase | A61B 3/102 351/206 |
| 2014/0152998 | A1* | 6/2014 | Okuda | G01B 9/02007 356/498 |
| 2014/0186212 | A1* | 7/2014 | Freeman | G01N 21/76 422/52 |

FOREIGN PATENT DOCUMENTS

| | | |
|---|---|---|
| KR | 101434965 B1 | 8/2014 |
| KR | 101538028 B1 | 7/2015 |
| KR | 101540541 B1 | 7/2015 |

* cited by examiner

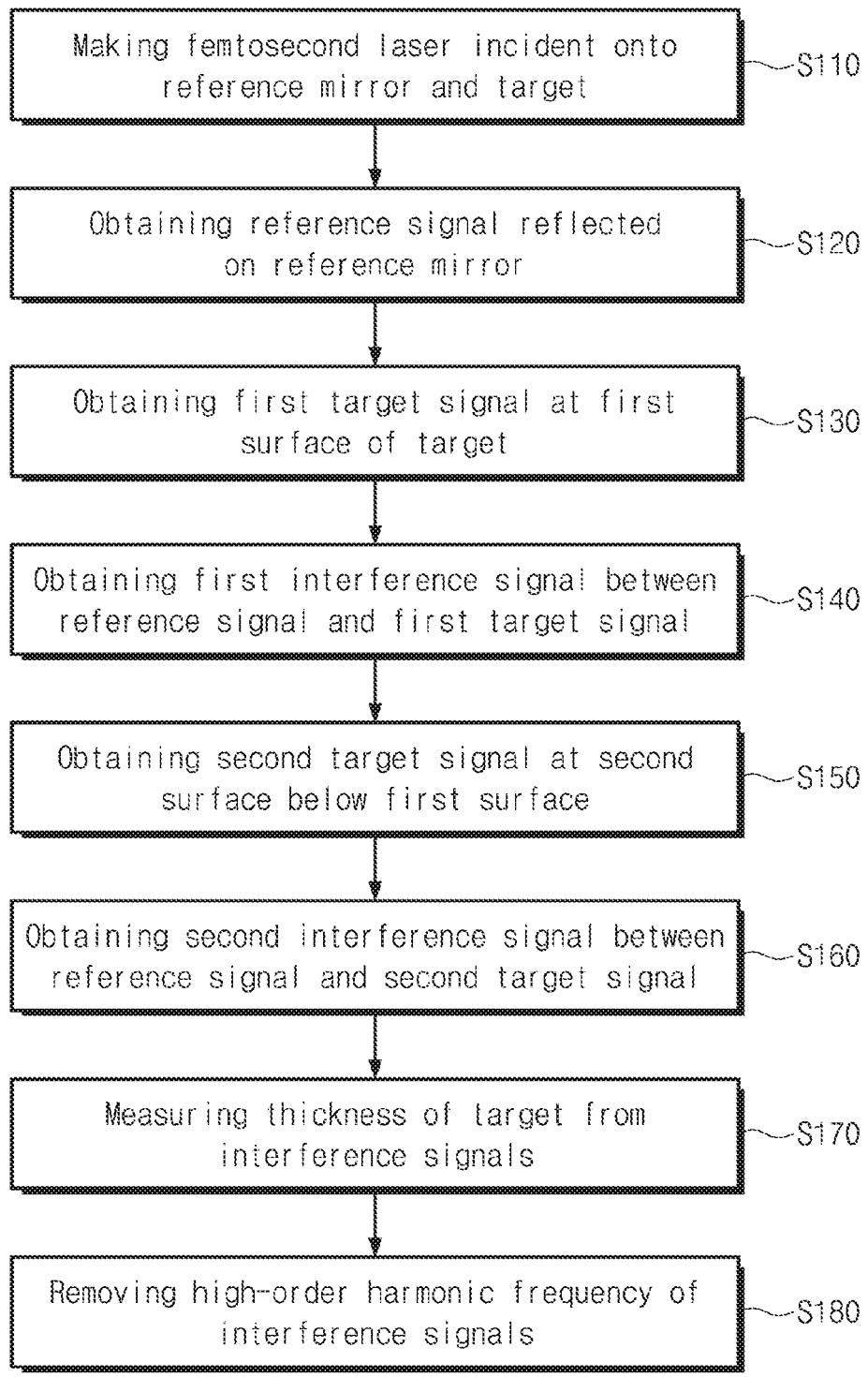

APPARATUS AND METHOD FOR MEASURING THICKNESS

CROSS-REFERENCE TO RELATED APPLICATIONS

This U.S. non-provisional patent application claims priority under 35 U.S.C § 119 to Korean Patent Application No. 10-2006-0075906, filed on Jun. 17, 2016 in the Korean Intellectual Property Office (KIPO), the entire contents of which are hereby incorporated by reference.

BACKGROUND

The present inventive concepts relate to apparatuses and methods for measuring a thickness and, more particularly, to apparatuses and a methods for measuring thicknesses of individual layers in a stacked structure using a femto-second laser.

As the semiconductor device becomes complicated and finely patterned, thicknesses of respective layers in a semiconductor device have affected the total package size and performance of the chip depending on its thickness. Accordingly, a gap height between the chips needs to be precisely measured.

SUMMARY

Example embodiments of the present inventive concepts provide enhanced reliable apparatus and methods for measuring thicknesses.

According to example embodiments of the present inventive concepts, an apparatus for measuring a thickness may include a light source that emits a femto-second laser, a first optical coupler through which a first portion of the femto-second laser is incident onto a target and a second portion of the femto-second laser is incident onto a reference mirror, a detector configured to receive a reflection signal reflected on the reference mirror and a sample signal generated from the target, the detector configured to measure a thickness of the target based on an interference signal between the reflection signal and the sample signal, and a plurality of optical fiber lines configured to connect the light source, the optical coupler, and the detector to each other.

According to example embodiments of the present inventive concepts, a method for measuring a thickness may include emitting a femto-second laser, directing a first portion of the femto-second laser to be incident onto a reference mirror, directing a second portion of the femto-second laser to be incident onto a stacked structure, receiving a reference signal reflected from the reference mirror, receiving sample signals from the stacked structure, and measuring thicknesses of individual layers included in the stacked structure based on the interference signals between the reference signal and the sample signals. The step of measuring the thickness may include transforming peaks of the interference signals into thicknesses of layers included in the stacked structure, respectively.

According to example embodiments of the present inventive concepts, an apparatus for measuring a thickness may include a light source configured to emit a pulsed laser having a near-infrared band wavelength, a first optical coupler configured to direct a first portion of the pulsed laser onto a target and a second portion of the pulsed laser onto a reference mirror, and a detector configured to receive a reflection signal reflected from the reference mirror and sample signals generated from the target, the detector configured to measure thicknesses of individual layers in the target based on an interference signal between the reflection signal and the sample signals.

BRIEF DESCRIPTION OF THE DRAWINGS

FIG. 3 is a flow chart showing a procedure of measuring a thickness of the target shown in FIG. 2 using the apparatus for measuring a thickness of FIG. 1A.

DETAILED DESCRIPTION

Figure 1A:
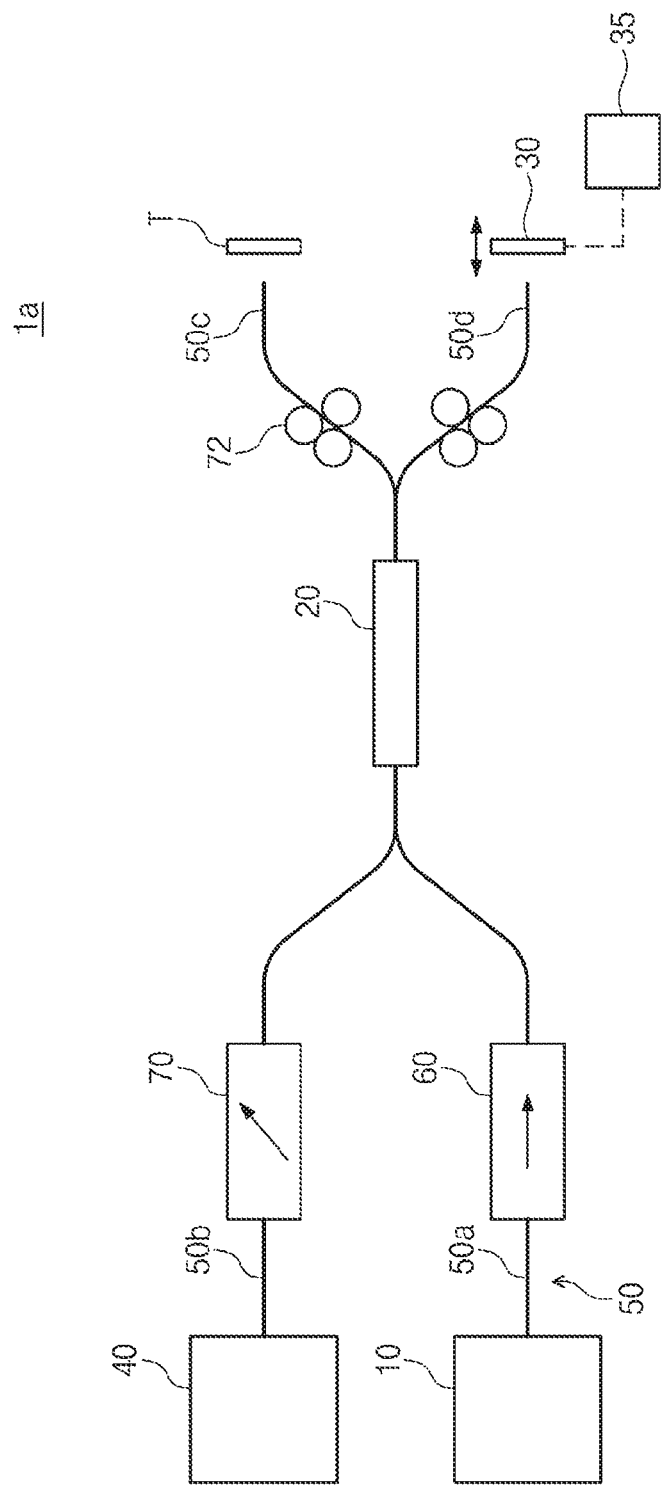
FIG. 1A shows an apparatus for measuring a thickness according to example embodiments of the present inventive concepts.

FIG. 1A shows a thickness measuring apparatus 1a according to example embodiments of the present inventive concepts. The thickness measuring apparatus 1a may be configured to measure a thickness of a target T. In case that the target T is a stacked structure, the thickness measuring apparatus 1a may be configured to measure respective thicknesses of layers included in the target T. Referring to FIG. 1A, the thickness measuring apparatus 1a may include a light source 10, an optical coupler 20, a reference mirror 30, a reference mirror driving unit 35, a detector 40, an optical fiber 50, an isolator 60, and polarizing devices 70 and 72. The thickness measuring apparatus 1a of FIG. 1A may be a reflection type thickness measuring apparatus.

The light source 10 may emit a pulsed laser. For example, the light source 10 may emit a femto-second laser. The femto-second is a laser which emits optical pulses with a duration in the domain of femto-seconds (1 fs=$10^{-15}$ s), thus belongs to the category of ultra-fast lasers or ultra-short pulse lasers. The light source 10 may emit light having a near-infrared band wavelength. The femto-second laser may be a pulsed laser whose energy is irradiated for a period of several tens to several hundreds of femto seconds, and have improved phase coherence and/or in-phase interference with respect to multi-frequency signals. In this description, the terms of light and signal are interchangeably used. However, these terms can be used separately, as follows. For example, the term "light" may be used to refer to light or a signal before reflection/transmission occurs and the term "signal" may be used to refer to light or a signal after the reflection/transmission occurs.

The optical fiber 50 may connect the light source 10, the optical coupler 20, the reference mirror 30, the reference mirror driving unit 35, the detector 40, the isolator 60, and the polarizing devices 70 and 72 to each other. Thus, the optical fiber 50 may provide an optical path in the thickness measuring apparatus 1a.

The optical fiber 50 may include a first line 50a, a second line 50b, a third line 50c, and a fourth line 50d. The first line 50a may connect the light source 10 to one end of the optical coupler 20, and the second line 50b may connect the detector 40 to the one end of the optical coupler 20. The third line 50c may extend toward the target T from an opposite end of the optical coupler 20, and the fourth line 50d may extend toward the reference mirror 30 from the opposite end of the optical coupler 20. The third line 50c may include an end disposed adjacent to the target T, and the fourth line 50d may include an end disposed adjacent to the reference mirror 30.

The optical coupler 20 may be configured to split an optical signal in a single optical fiber into a plurality of optical fibers and may also be configured to gather optical signals in a plurality of optical fibers into a single optical fiber. The optical coupler 20 may be a two-by-two (2×2) coupler and, as discussed above, may include the one end that is connected to the light source 10 and the detector 40 and the opposite end that is disposed adjacent to the target T and the reference mirror 30. The one end of the optical coupler 20 may be an input end, and the opposite end of the optical coupler 20 may be an output end. The optical coupler 20 may direct the target T to receive a portion of the femto-second laser light emitted from the light source 10, and may direct the reference mirror 30 to receive other portion of the femto-second laser light emitted from the light source 10.

For example, after the femto-second laser light is provided to the optical coupler 20 through the first line 50a, a portion of the femto-second laser may be incident onto the target T through the third line 50c and other portion of the femto-second laser may be incident onto the reference mirror 30 through the fourth line 50d. FIG. 1A illustrates that the optical fiber 50 connects the light source 10, the target T, and the reference mirror 30 to each other and the optical coupler 20 divides and connects the optical fiber 50. In some example embodiments, the optical coupler 20 may be replaced by a beam splitter, a half mirror, etc. In other words, various kinds of optical devices may be available as the optical coupler 20 so as to reflect a portion of incident light and transmit other portion of incident light.

Figure 2:
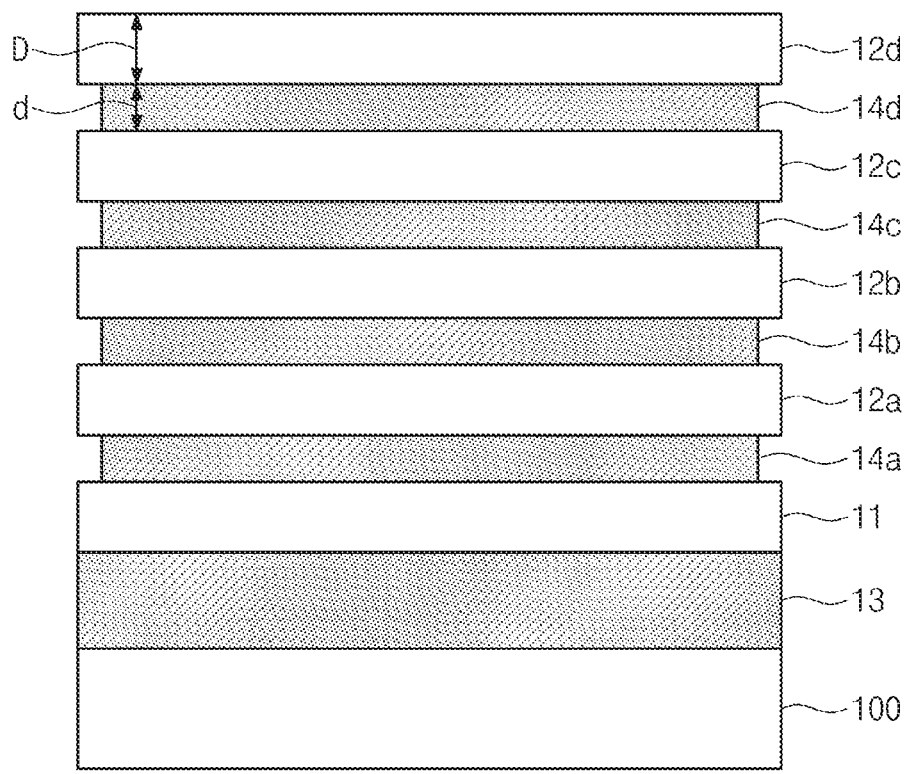
FIG. 2 shows an example of a target T.

FIG. 2 shows an example of the target T. The target T may be a stacked structure such as a semiconductor device. The reference symbol T may denote the semiconductor device as well as the target. Respective dimensions of components included in the semiconductor device T depicted in FIG. 2 may be different from an actual ratio. The semiconductor device T may include a substrate 100, a buffer film 11, a first adhesive 13 between the substrate 100 and the buffer film 11, a plurality of chips 12a, 12b, 12c and 12d stacked on the buffer film 11, and second adhesives 14a, 14b, 14c and 14d between the plurality of chips 12a, 12b, 12c and 12d. Although FIG. 2 illustrates four chips 12a, 12b, 12c and 12d stacked on the substrate 100, the number of chips 12a to 12d is not limited thereto. FIG. 2 also shows the semiconductor device T includes the chips 12a, 12b, 12c and 12d, the buffer film 11, and the adhesives 13, 14a, 14b, 14c and 14d on the substrate 100. In some example embodiments, however, the semiconductor device T may further include solder bumps stacked between the chips 12a-12d and/or a mold layer encapsulating the chips 12a to 12d. The thickness measuring apparatus 1a of FIG. 1A may be used to measure respective thicknesses of the layers included in the semiconductor device T. For example, the thickness measuring apparatus 1a of FIG. 1A may measure respective thicknesses D of the chips 12a to 12d and respective thicknesses d of the second adhesives 14a to 14d. The target T whose thickness is measured by the thickness measuring apparatus 1a of FIG. 1A may include a material whose reflectivity is greater than transmissivity. Although not shown in figures, a supporter for supporting the target T or a vacuum chamber for accommodating the target T may be provided.

Referring back to FIG. 1A, the target T may reflect the femto-second laser light that is incident thereon through the third line 50c, and a target signal generated at this time may be re-incident onto the third line 50c. The target signal may be a reflection signal. The reflection signal may be transmitted to the detector 40 through the third line 50c and the second line 50b. Although not shown in figures, an optic (e.g., a lens) may be provided between the third line 50c and the target T and thus may control incidence and reflection directions of the femto-second laser.

The reference mirror 30 may reflect the femto-second laser that is incident thereon through the fourth line 50d, and a reflection signal generated at this time may be re-incident onto the fourth line 50d. The reflection signal may be transmitted to the detector 40 through the fourth line 50d and the second line 50b. In this stage, the reference mirror driving unit 35 may drive to move the reference mirror 30 along the incidence direction of the femto-second laser. The reference mirror driving unit 35 may reciprocally move the reference mirror 30 within a desired (or alternatively, predetermined) range. As the reference mirror driving unit 35 changes a position of the reference mirror 30, reference signals reflected on the reference mirror 30 may have different optical paths from each other. Although not shown in figures, an optic (e.g., a lens) may be provided between the fourth line 50d and the reference mirror 30 and thus may control incidence and reflection directions of the femto-second laser.

The detector 40 may receive the reference and reflection signals and obtain interference signals therebetween. The detector 40 may include a controller and an image display for analyzing and displaying so that the analyzed signals may be displayed. For example, the detector 40 may include a photodiode. The detector 40 may obtain interference signals to measure respective thicknesses of the target T and its layers.

The isolator 60 may be installed on the first line 50a between the light source 10 and the optical coupler 20. The isolator 60 may transfer the femto-second laser on the first line 50a in a single direction between the light source 10 and the optical coupler 20. The polarizing devices 70 and 72 may be provided on the optical path of the optical fiber 50. The polarizing devices 70 and 72 may selectively extract a portion having a vibration in a specific direction from the femto-second laser. For example, the polarizing devices 70 and 72 may include a polarizing filter or a polarizing mirror. FIG. 1A shows that the polarizing devices 70 and 72 are disposed on the second, third, and fourth lines 50b, 50c, and 50d, but example embodiments are not limited thereto. In some example embodiments, the polarizing devices 70 and 72 may be disposed either on all or on one of the first to fourth lines 50a to 50b.

Figure 1B:
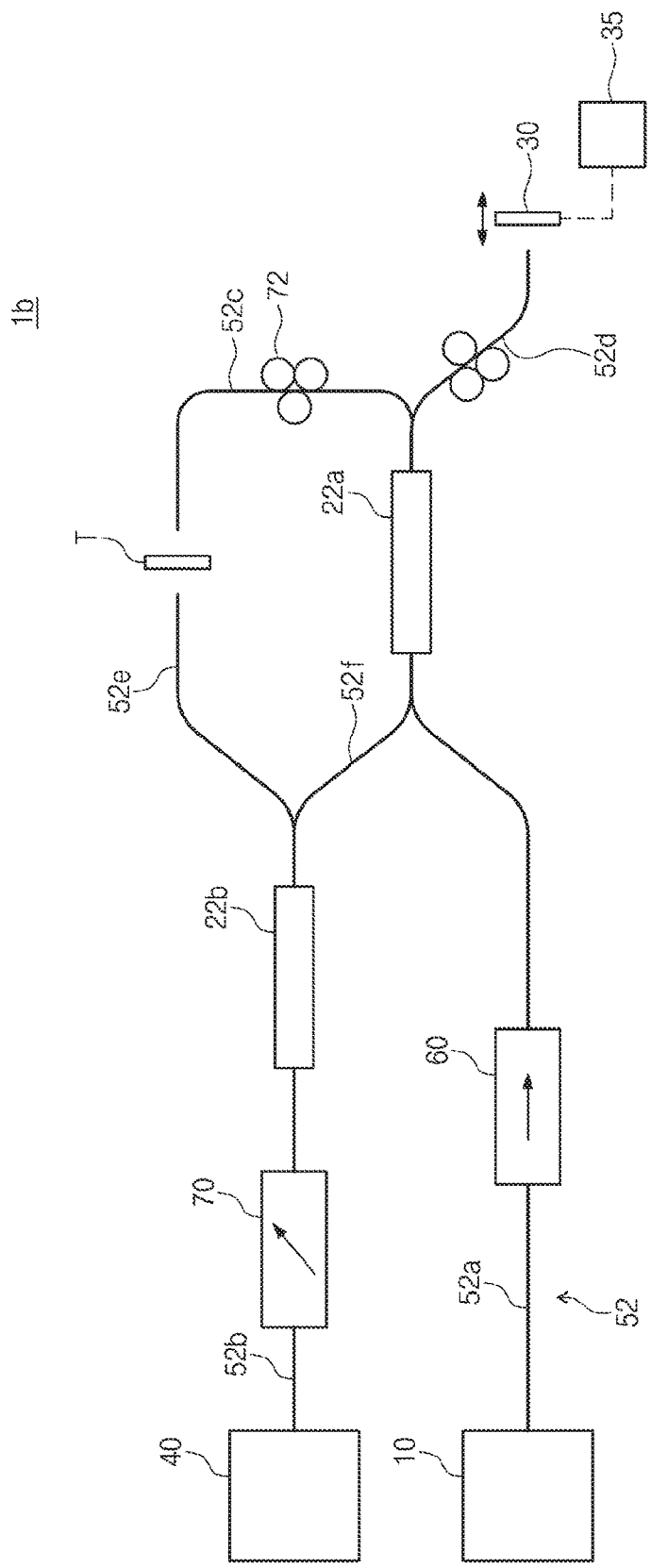
FIG. 1B shows an apparatus for measuring a thickness according to example embodiments of the present inventive concepts.

FIG. 1B shows a thickness measuring apparatus 1b according to example embodiments of the present inventive concepts. In the thickness measuring apparatus 1b, components substantially the same as those of the thickness measuring apparatus 1a discussed with reference to FIG. 1A are allocated with the same reference numerals, and a repetitive description thereof will be omitted for brevity of the description. The thickness measuring apparatus 1b of FIG. 1B may be a transmission type thickness measuring apparatus. The target T whose thickness is measured by the thickness measuring apparatus 1b of FIG. 1B may include a material whose transmissivity is greater than reflectivity.

Referring to FIG. 1B, the thickness measuring apparatus 1b may include a light source 10, first and second optical couplers 22a and 22b, a reference mirror 30, a reference mirror driving unit 35, a detector 40, an optical fiber 52, an isolator 60, and polarizing devices 70 and 72. The light source 10 may emit a near-infrared (NIR) ray having a high optical transmittance. The first optical coupler 22a may be disposed between the light source 10 and the target T, and the second optical coupler 22b may be disposed between the first optical coupler 22a and the detector 40. The first optical coupler 22a may direct the target T to receive a portion of the femto-second laser light emitted from the light source 10, and may direct the reference mirror 30 to receive other portion of the femto-second laser light emitted from the light source 10. The detector 40 may receive a reference signal and target signals transmitted from the second optical coupler 22b. The first optical coupler 22a may be a two-by-two (2×2) coupler, and the second optical coupler 22b may be a one-by-two (1×2) coupler.

The optical fiber 52 may include a first line 52a, a second line 52b, a third line 52c, a fourth line 52d, a fifth line 52e, and a sixth line 52f. The first line 52a may connect the light source 10 to one end of the first optical coupler 22a, and the second line 52b may connect the detector 40 to one end of the second optical coupler 22b. The third line 52c may extend toward the target T from an opposite end of the first optical coupler 22a, and the fourth line 52d may extend toward the reference mirror 30 from the opposite end of the first optical coupler 22a. The fifth line 52e may extend toward the target T from an opposite end of the second coupler 22b, and the sixth line 52f may connect to each other the one end of the first optical coupler 22a and the opposite end of the second optical coupler 22b. The one end of the first optical coupler 22a may be an input end, and the opposite end of the first optical coupler 22a may be an output end. The one end of the second optical coupler 22b may be an input end, and the opposite end of the second optical coupler 22b may be an output end. The third line 52c and the fifth line 52e may include respective ends disposed adjacent to the target T, and the fourth line 52d may include an end disposed adjacent to the reference mirror 30. The respective ends of the third and fifth lines 52c and 52e may be oppositely disposed across the target T. For example, the respective ends of the third and fifth lines 52c and 52e may be spaced apart by the same distance in opposite directions with respect the target T. Although not shown in figures, an aligner and/or an optic such as a lens may be provided between the respective ends of the third and fifth lines 52c and 52e.

The femto-second laser light emitted from the light source 10 may be transferred to the first optical coupler 22a through the first line 52a, a portion of the femto-second laser light may be incident onto the target T through the third line 52c, and other portion of the femto-second laser light may be incident onto the reference mirror 30 through the fourth line 52d. The target T may reflect the femto-second laser light that is incident thereon, and a target signal generated at this time may be re-incident onto the fifth line 52e. The target signal may be a transmission signal. The transmission signal may be transferred to the detector 40 through the fifth line 52e and the second line 52b. A reference signal reflected on the reference mirror 30 may be re-incident onto the fourth line 52d, and then transmitted to the detector 40 through the sixth and second lines 52f and 52b.

The thickness measuring apparatus 1a and 1b respectively depicted in FIGS. 1A and 1B may use the femto-second laser to measure a thickness of the target T. As the femto-second laser is used, phase coherence with respect to multi-frequency signals may be enhanced, and thus measurement accuracy may be improved. Because the optical fiber is employed to connect optical devices to each other, the thickness measuring apparatus 1a and 1b may have a reduced light loss and may be less restricted by space limitation. One of the thickness measuring apparatus 1a and 1b of FIGS. 1A and 1B may be selected based on material characteristics of the target T, for example, by comparing transmissivity to reflectivity of the target T.

FIG. 3 is a flow chart showing a procedure of measuring a thickness of the target T shown in FIG. 2 using the thickness measuring apparatus 1a of FIG. 1A. FIGS. 4A to 4F are figures showing a method for measuring a thickness related to FIG. 3. Hereinafter a method for measuring a thickness will be discussed with reference to FIGS. 3 to 4F. For brevity of the description, in FIGS. 4A to 4C, some components of the thickness measuring apparatus 1a and the target T are omitted and some other components thereof are exaggeratingly illustrated. Further, for brevity of the drawings, some optical path is omitted and some optical path is exaggeratingly illustrated.

Figure 4A:
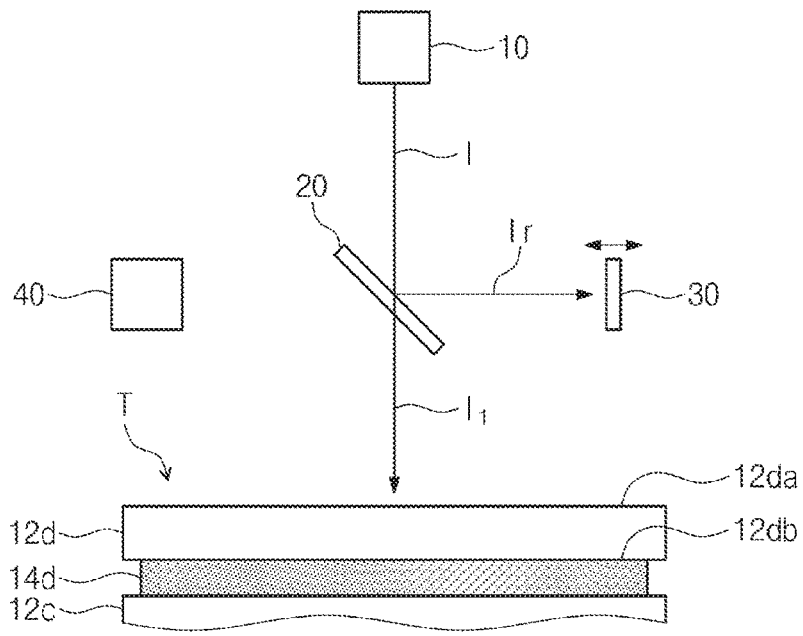
FIGS. 4A to 4F shows a method for measuring a thickness related to FIG. 3.

Referring to FIGS. 3 and 4A, the light source 10 may emit the femto-second laser I. Through the optical coupler 20, a portion $I_1$ of the femto-second laser I may be incident onto the target T and other portion $I_r$ of the femto-second laser I may be incident onto the reference mirror 30 (S110). Hereinafter, for convenience of the description, the portion $I_1$ of the femto-second laser I may also be referred to as a first light, and the other portion $I_r$ of the femto-second laser I may also be referred to as a reference light.

Figure 4B:
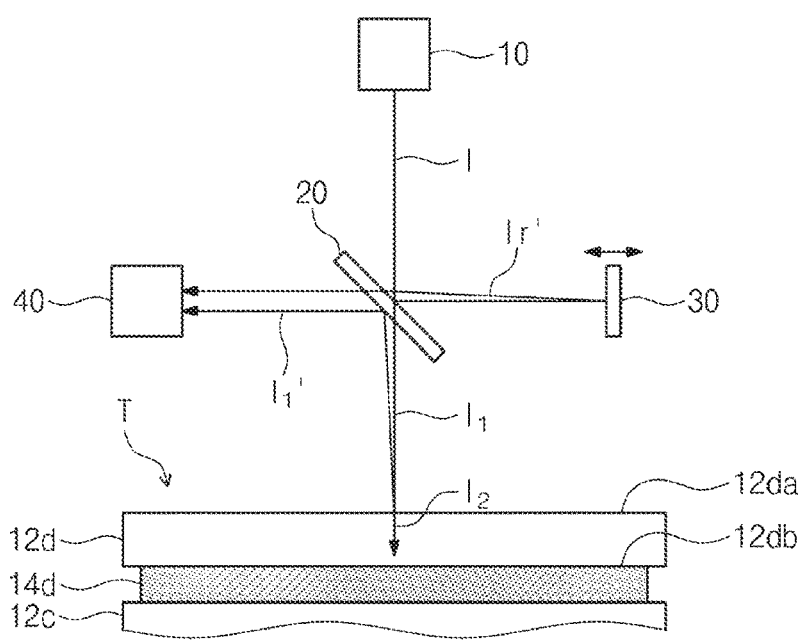

Referring to FIGS. 3 and 4B, the detector 40 may detect a reference signal $I_r'$ reflected on the reference mirror 30 and a first target signal $I_1'$ generated from a first surface 12da of the target T (S120 and S130). The first surface 12da may be an uppermost surface of the target T, e.g., a top surface of an uppermost chip 12d illustrated in FIG. 2. Due to a difference of refractive index on the first surface 12da, a portion of the first light $I_1$ may be reflected and other a portion of the first light $I_1$ may be transmitted below the first surface 12da. The reflected portion of the the first light $I_1$ may correspond to the first target signal $I_1'$. The other portion of the the first light I1 transmitted below the first surface 12da may be referred to hereinafter as a second light I2. The detector 40 may obtain a first interference signal between the reference signal $I_r'$ and the first target signal $I_1'$ (S140).

Figure 4C:
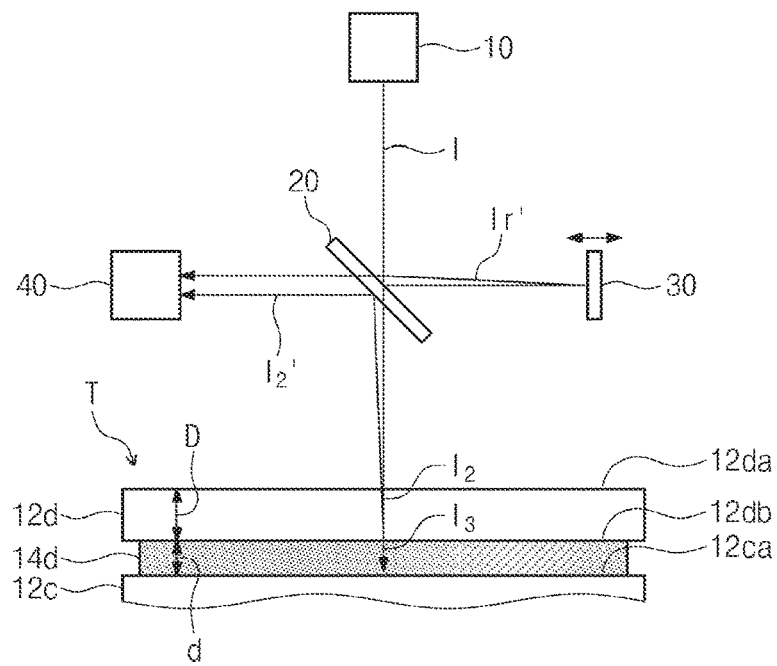

Referring to FIGS. 3 and 4C, the detector 40 may detect a second target signal $I_2'$ generated from a second surface 12db below the first surface 12da (S150). The second surface 12db may be a surface that is directly below the first surface 12da, e.g., a bottom surface of the uppermost chip 12d. Due to a difference of refractive index on the second surface 12db, a portion of the second light $I_2$ may be reflected and other portion of the second light $I_2$ may be transmitted below the second surface 12db. The reflected portion of the second light $I_2$ may correspond to the second target signal $I_2'$. The other portion of the second light $I_2$ transmitted below the second surface 12db may be referred to hereinafter as a third light $I_3$. The detector 40 may obtain a second interference signal between the reference signal $I_r'$ and the second target signal $I_2'$ (S160). Likewise, the detector 40 may additionally obtain target signals on each of surfaces (e.g., a top surface 12ca of the chip 12c directly below the uppermost chip 12d) below the second surface 12db and additionally obtain interference signals between the reference signal Ir' and the additionally obtained target signals, respectively. Surfaces included in the target T may include interfaces on each of which a refractive index is changed.

Figure 4D:
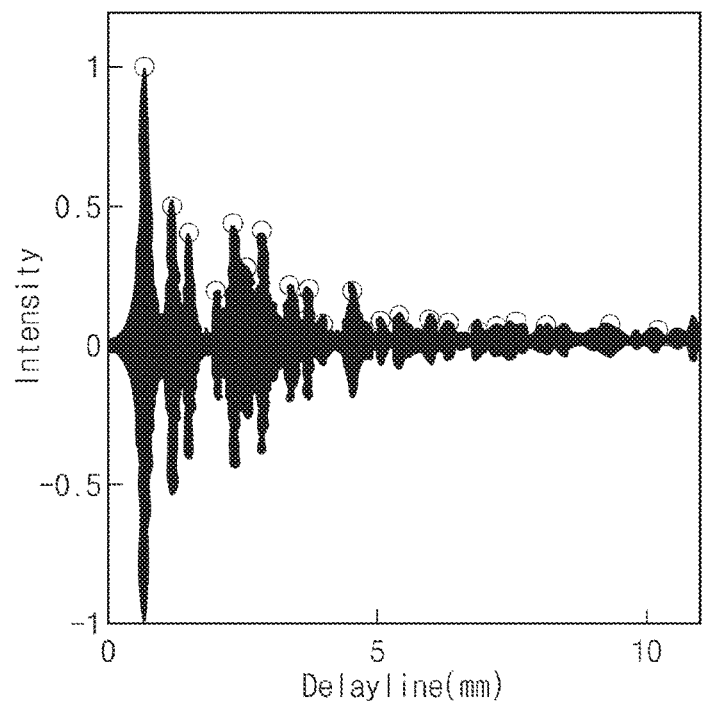
Figure 4E:
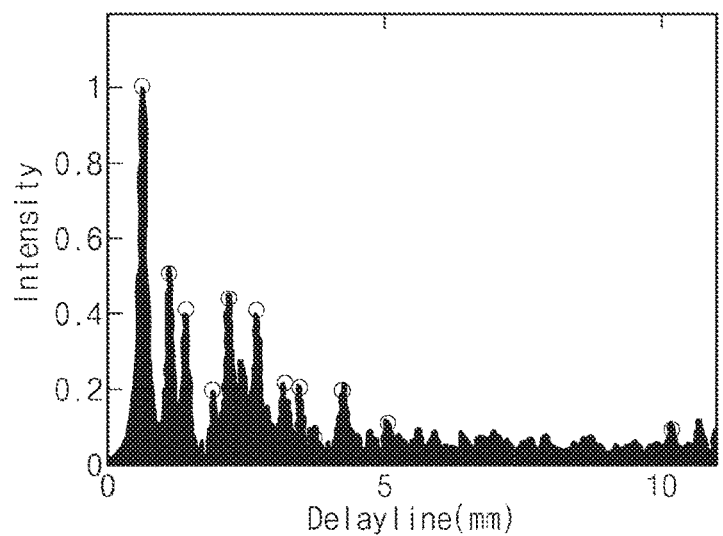
Figure 4F:
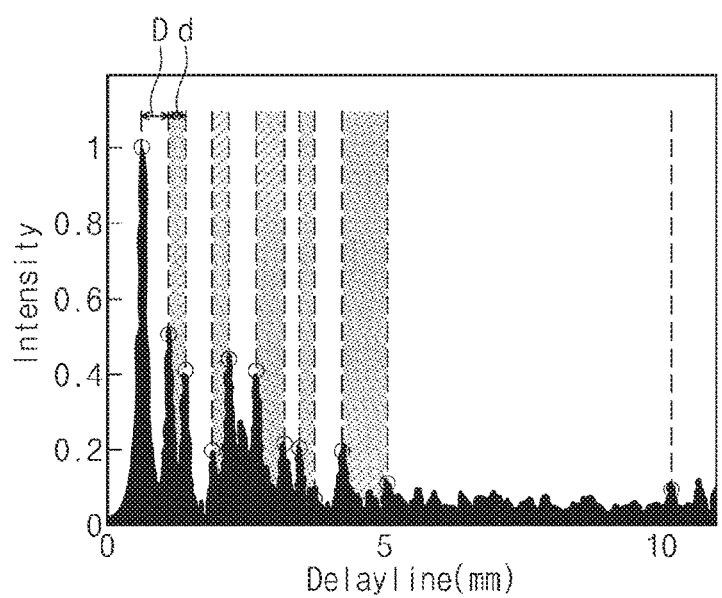

FIG. 4D is an interference fringe showing interference signals obtained from the detector 40. FIG. 4E is a corrected interference fringe of FIG. 4D, and FIG. 4F is a figure showing FIG. 4E superimposed on the target T of FIG. 2. The detector 40 may detect optical path lengths corresponding to respective thicknesses of the layers included in the target T based on the interference signals. For example, the detector 40 may detect peaks of individual interference signals and thus ascertain respective thicknesses of the layers (S170). The peaks may be points where a constructive interference occurs when respective optical lengths of the interference signals are the same as an optical length of the reference signal. The detector 40 may transform the interference signals into respective thicknesses of the layers using refractive indices of materials comprising the target T. For example, in case that a refractive index is "n" and a thickness between two surfaces is "d," and the target signal corresponds to a reflection signal, an optical path length between adjacent two peaks may be "2nd." Therefore, an optical path length between adjacent peaks may be transformed into its corresponding thickness. In this stage, noise may be produced due to high-order harmonic frequencies generated from a multiple reflection on respective surfaces. Thus, a peak due to the high-order harmonic frequency may be mistakenly regarded as a peak at an interface. Referring to FIGS. 4D and 4E, the detector 40 may remove the noise by removing the high-order harmonic frequencies of the interference signals (S180). The detector 40 may be designed to remove the high-order harmonic frequencies in accordance with a wavelength of the femto-second laser. For example, second or more order harmonic frequency may be removed. Hollow circles shown in FIG. 4D may express peaks prior to the noise removal, while hollow circles shown in FIG. 4E may express peaks after the noise removal.

Referring to FIGS. 2 and 4F, respective thicknesses of the layers included in the target T may be measured based on the interference signals. As discussed above, respective refractive indices of materials constituting the target T may be used to transform the interference signals into respective thicknesses of the layers. That is, the thickness measuring apparatus 1a may measure the thickness D of each chip and a spacing (e.g., the thickness d of each adhesive) between the chips. Furthermore, in the method of measuring a thickness according to some example embodiments of the present inventive concepts, a low energy wavelength band may be used to prevent characteristic change of the semiconductor device T and enable a high-speed measurement.

Although the aforementioned method for measuring a thickness is discussed with regard to the reflection type thickness measuring apparatus 1a of FIG. 1A, the transmission type thickness measuring apparatus 1b of FIG. 1B can be employed to measure respective thicknesses of the layers using the transmission signals instead of the reflection signals. For the transmission type thickness measuring apparatus 1b of FIG. 1B, the interference signals may be obtained from the reference signal and the transmission signals, and thus respective thicknesses of the layers included in the target T can be measured as discussed above with regard to the reflection type thickness measuring apparatus 1a of FIG. 1A. In the case that a measuring apparatus is a transmission type thickness measuring apparatus, a refractive index is n, a thickness between two surfaces is d, and the target signal may correspond to the transmission signal, an optical path length between adjacent two peaks may be "nd," differently from "2nd" for a reflection type thickness measuring apparatus. In this description, the semiconductor device is selected as an example of the target T, but not limited thereto. The present inventive concepts are applicable to any stacked structure including multi layers whose refractive indices are different from each other.

As the apparatus and method for measuring a thickness according to the present inventive concepts use the femto-second laser, it may be advantageous to enhance phase coherence with respect to multi-frequency signals and improve measurement accuracy. In addition, as the optical fiber is employed to connect optical devices to each other, light loss can be reduced and space limitation may be relaxed. Furthermore, because a low energy wavelength band is used, characteristic change of the semiconductor device T may be mitigated or prevented and a high-speed measurement can be enabled.

The example embodiments herein are presented to facilitate understanding of the present inventive concepts and should not limit the scope of the present inventive concepts, and it is intended that the present inventive concepts cover the various combinations, the modifications, and variations. The technical protection scope of the present inventive concepts will be defined by the technical spirit of the appended claims, and is intended to include all modifications and equivalent substantially falling within the spirit and scope of the invention while not being limited by literary descriptions in the appended claims.

What is claimed is:

1. An apparatus for measuring a thickness, comprising:
 a light source configured to emit a femto-second laser;
 a reference mirror configured to reflect the femto-second laser;
 a first optical coupler through which a first portion of the femto-second laser is incident onto a target and a second portion of the femto-second laser is incident onto a reference mirror;
 a detector configured to receive a reflection signal reflected on the reference mirror and a sample signal generated from the target, the detector configured to measure a thickness of the target based on an interference signal between the reflection signal and the sample signal;
 a plurality of optical fiber lines configured to connect the light source, the first optical coupler, and the detector to each other; and
 a reference mirror driver configured to move the reference mirror along an incidence direction of the femto-second laser,
 wherein the detector is configured to determine the thickness of the target based on a distance that the reference mirror has moved between peaks of the interference signal, and
 wherein the plurality of optical fiber lines includes,
  a first optical fiber line connecting the light source to the one end of the first optical coupler,
  a second optical fiber line connecting the detector to the one end of the first optical coupler,
  a third optical fiber line extending from the opposite end of the first optical coupler toward the target such that one end of the third optical fiber line faces the target, and
  a fourth optical fiber line extending from the opposite end of the first optical coupler toward the reference mirror such that one end of the fourth optical fiber line faces the reference mirror.

2. The apparatus of claim 1, wherein the first optical coupler include one end connected to the light source and the detector and an opposite end adjacent to the target and the reference mirror.

3. The apparatus of claim 1, further comprising:
 a second optical coupler on one of the plurality of optical fiber lines, the one of the plurality of optical fiber lines between the first optical coupler and the detector.

4. The apparatus of claim 3, wherein the plurality of optical fiber lines further includes:
 a fifth optical fiber line extending toward the target from an opposite end of the second optical coupler; and
 a sixth optical fiber line connecting the one end of the first optical coupler to the opposite end of the second optical coupler.

5. The apparatus of claim 4, wherein an end of the third optical fiber line and an end of the fifth optical fiber line are arranged to face each other on opposite sides of the target.

6. The apparatus of claim 1, wherein the sample signal is a reflection signal reflected from the target.

7. The apparatus of claim 1, wherein the sample signal is a transmission signal transmitted through the target.

8. An apparatus for measuring a thickness, comprising:
 a light source configured to emit a pulsed laser having a near-infrared band wavelength;
 a reference mirror configured to reflect the pulsed laser;
 a first optical coupler configured to direct a first portion of the pulsed laser onto a target and a second portion of the pulsed laser onto a reference mirror;
 a detector configured to receive a reflection signal reflected from the reference mirror and sample signals generated from the target, the detector configured to measure thicknesses of individual layers in the target based on an interference signal between the reflection signal and the sample signals; and
 a reference mirror driver configured to move the reference mirror along an incidence direction of the pulsed laser, wherein the detector is configured to determine the thicknesses of the individual layers in the target based on a distance that the reference mirror has moved between peaks of the interference signal, and
 wherein the plurality of optical fiber lines includes,
  a first optical fiber line connecting the light source to the one end of the first optical coupler,
  a second optical fiber line connecting the detector to the one end of the first optical coupler,
  a third optical fiber line extending from the opposite end of the first optical coupler toward the target such that one end of the third optical fiber line faces the target, and
  a fourth optical fiber line extending from the opposite end of the first optical coupler toward the reference mirror such that one end of the fourth optical fiber line faces the reference mirror.

9. The apparatus of claim 8, wherein the detector is further configured to remove high-order harmonic frequencies from the interference signal in accordance with a wave length of the pulsed laser.

10. The apparatus of claim 8, further comprising:
 a second optical coupler between the detector and the first optical coupler, one end of the second optical coupler optically connected to the detector, and an opposite end of the second optical coupler adjacent to the target and optically connected to the first optical coupler.

* * * * *